Oct. 24, 1967 H. MANN 3,349,191

TALK-OFF PROTECTION FOR IN-BAND TELEPHONE SIGNALING SYSTEMS

Filed Jan. 7, 1965 2 Sheets-Sheet 1

INVENTOR
H. MANN
BY R. B. Anderson
ATTORNEY

TALK-OFF PROTECTION FOR IN-BAND TELEPHONE SIGNALING SYSTEMS

Filed Jan. 7, 1965

United States Patent Office 3,349,191
Patented Oct. 24, 1967

3,349,191
TALK-OFF PROTECTION FOR IN-BAND TELEPHONE SIGNALING SYSTEMS

Henry Mann, Berkeley Heights, N.J., assignor to Bell Telephone Laboratories, Incorporated, New York, N.Y., a corporation of New York Filed Jan. 7, 1965, Ser. No. 424,077
4 Claims. (Cl. 179—84)

This invention relates generally to the transmission of telephone signaling information over interoffice trunks and more particularly to the transmission of such information by the use of single-frequency tones which are within the range of frequencies normally occupied by voice-frequency message waves.

Signaling, in telephone parlance, refers to the transmission of control information ancillary to the voice-frequency message waves which it is the primary purpose of a telephone system to transmit. In trunks interconnecting telephone central offices, typical signaling information includes that needed to establish and maintain each telephone connection as well as that needed to terminate each connection subsequent to its establishment. Because most present day long distance telephone trunks use carrier transmission, the most common signaling arrangements make use of at least one substantially single-frequency in-band tone to transmit the necessary control information. Such signaling arrangements are fully compatible with carrier trunks because the tones can be transmitted in exactly the same way as the voice-frequency message waves. The tones are referred to as in-band simply because the signals for a particular connection are sent in the same frequency band as the voice-frequency message rather than in some higher frequency band or as D-C signals.

In a typical in-band signaling system, a substantially single-frequency tone within the voice band is transmitted over the telephone trunk from one central office to another to indicate that the trunk is idle and removed to indicate that the trunk is busy. To avoid false trunk-idle indications when the transmitted voice-frequency message waves contain sufficient energy at the signaling frequency, most in-band signaling systems make use of a so-called guard circuit at the receiving terminal to detect energy in the remainder of the voice-frequency band. In such systems, a trunk-idle indication is permitted only when the ratio of the energy at the signaling frequency to the energy in the remainder of the band exceeds a predetermined value for at least a minimum length of time. Because speech usually contains more energy in the remainder of the voice-frequency band than it does at the signaling frequency, false trunk-idle indications are normally avoided.

Even with guard circuits employed, occasional abnormal conditions have caused in-band signaling systems to be troubled by false trunk-idle indications. Such false indications, which are likely to cause a connection to be released prematurely, can occur when external noises at the signaling frequency are generated by the telephone subscriber's premises. There have, for example, been complaints that birds in the vicinity of the telephone instrument or nearby bells and chimes have caused the subscriber to be disconnected. There have, in addition, been instances in which echoes in the telephone trunk itself have resulted in sufficient enhancement of energy at the signaling frequency because of poor return loss to produce the same result. Such an unwanted release of a previously established telephone connection is commonly referred to as talk-off.

In the past, one approach to a complete solution of the talk-off problem has been to employ complementary slot filters at the signaling transmitter and receiver. In such an arrangement, shown for example in copending application Serial No. 330,698, which was filed Dec. 16, 1963, by D. J. Leonard, now Patent No. 3,306,984, a band-elimination filter at the transmitter reduces any energy at or close to the signaling frequency sufficiently to avoid interference with signaling functions at the receiver. At the receiver, the complementary filter increases the gain of the receiving amplifier sufficiently at the same frequency to provide some semblance of a smooth transmission characteristic. Such an approach does, of course, represent a complete solution to the problem of talk-off. It suffers from an important noise disadvantage, however, in that any noise components at the signaling frequency which may have been acquired along the line are also enhanced at the receiver.

The object of the present invention is to solve the problem of talk-off in an in-band telephone signaling system without encountering any significant noise penalty.

In accordance with the invention, talk-off is prevented in an in-band telephone signaling system by inserting a band-elimination filter at the transmitting terminal to block energy in the voice-frequency message wave at the signaling frequency only when such energy components are sufficiently strong to create a talk-off problem. The signaling tone is applied to the trunk, when appropriate, on the output side of the filter. As a result, the transmitted voice-frequency message waves never contain sufficient energy at the signaling frequency, whether from external sources on the telephone subscriber's premises or from echoes within the telephone plant itself, to generate false signaling indications. At the same time, there is no impairment of the transmission characteristics of the trunk and, hence, no noise penalty except during those rare intervals when a talk-off problem would otherwise be presented.

In at least one embodiment of the invention, the in-band signaling system includes not only the usual arrangement at the receiver for determining the ratio of the received energy at the signaling frequency (called signal) to the received energy in the remainder of the voice frequency band (called guard) and for generating an idle trunk indication whenever the signal-to-guard ratio exceeds a predetermined threshold level but also a similar arrangement at the transmitter for determining the signal-to-guard ratio of voice-frequency message waves prior to transmission and inserting the band-elimination filter to block transmission of energy at the signaling frequency whenever that signal-to-guard ratio exceeds a predetermined threshold level. The band-elimination filter is thus inserted, and the resulting noise penalty incurred, only on those relatively rare occasions when the signal-to-guard ratio of the voice-frequency message waves would otherwise be large enough to produce a false trunk-idle signaling condition. In accordance with a feature of the invention, the threshold level for the signal-to-guard ratio is made lower at the transmitter than at the receiver, thereby insuring that energy at the signaling frequency is removed from the transmitted voice-frequency message waves before it reaches a level sufficient to cause a false idle trunk indication to be generated at the receiver.

A more complete understanding of the invention may be obtained by a study of the following detailed description of a specific embodiment. In the drawings.

Figure 1:
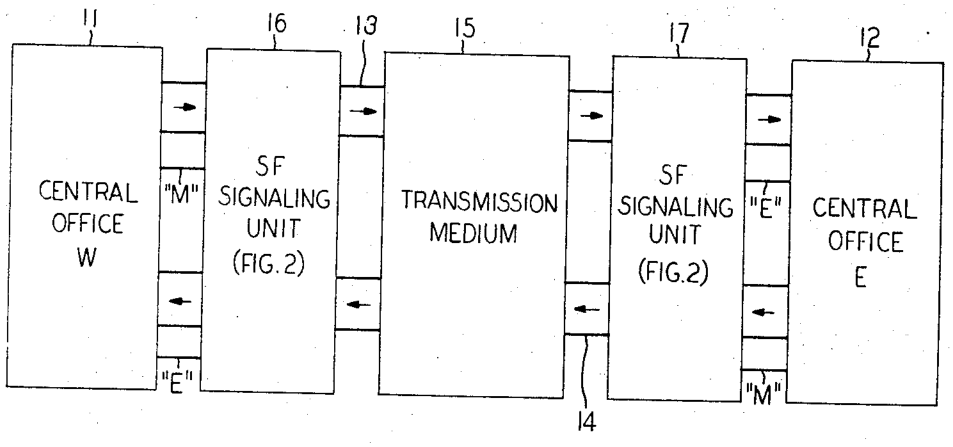
FIG. 1 is a block diagram of a telephone trunk circuit equipped with single-frequency in-band signaling units.

The telephone trunk circuit shown in FIG. 1 connects two central offices 11 and 12, labeled W and E respectively. In the example shown, the connection is four-wire, consisting of a W–E path 13 and an E–W path 14. The transmission medium 15 may be a direct wire connection or, what is more likely, may be respective W–E and E–W channels in a carrier system. Single-frequency signaling units 16 and 17, each composed of a transmitting section and a receiving section, are located between central office 11 and transmission medium 15 and between central office 12 and transmission medium 15, respectively. As illustrated, telephone signaling functions are provided by a so-called "M" lead connecting each single-frequency signaling unit transmitting section to its central office and by a so-called "E" lead connecting each single-frequency signaling unit receiving section to its central office. In operation, the central office equipment typically grounds the "M" lead when the trunk is idle and returns the "M" lead to the central office battery when the trunk is busy. The receiving section of each signaling unit grounds the "E" lead when a busy indication is received from the opposite end of the trunk and provides an open circuit when a busy indication is received.

Figure 2:
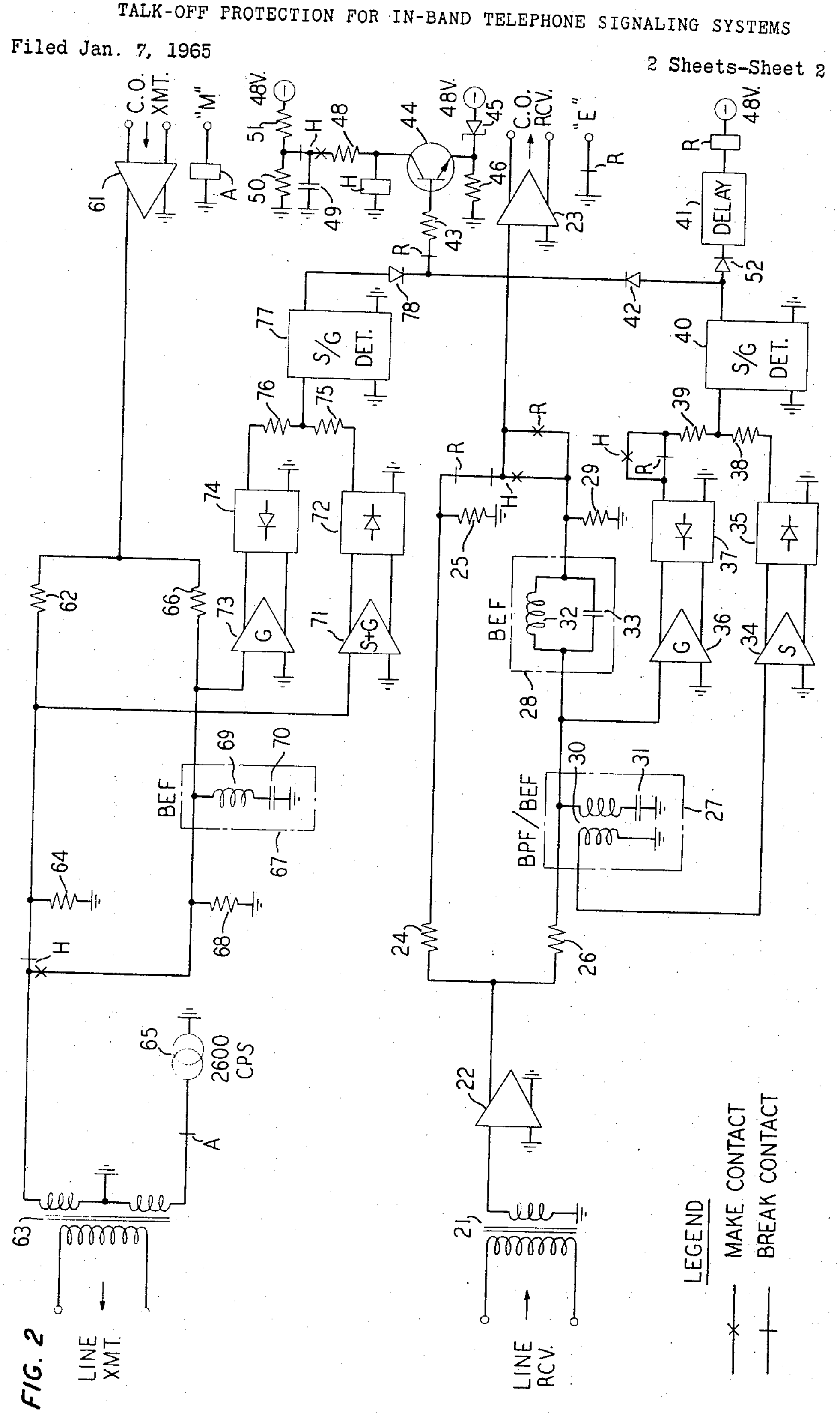
FIG. 2 illustrates a specific single-frequency in-band signaling unit embodying the invention.

A complete single-frequency signaling unit embodying the invention is illustrated in FIG. 2. The receiving section occupies the lower half of the figure and the transmitting section the upper. In the former, the incoming or receiving line from the transmission medium is connected to the primary winding of a transformer 21, the secondary winding of which is connected to a receiving preamplifier 22. The output of preamplifier 22 is connected to a receiving amplifier 23 through either of two paths. The first or busy path is through a resistor 24 and break contacts (closed when their relays are released) of a pair of relays R and H. A shunt resistor 25 is returned to ground from the right-hand or output side of resistor 24 for impedance matching purposes. The second or idle path from preamplifier 22 is through a resistor 26, a pair of filter sections 27 and 28, and parallel make contacts (open when their relays are released) of relays R and H. A shunt resistor 29 is returned to ground from the right-hand or output side of filter section 28 for impedance matching purposes. The output of receiving amplifier 23 is supplied to the receiving portion of the local central office equipment.

In the second or idle path from preamplifier 22, filter section 27 serves simultaneously as a bandpass filter and as a band-elimination filter. The primary winding of a transformer 30 and a capacitor 31 are connected in series from the right-hand side of resistor 26 to ground and tuned to resonate at the frequency of the signaling tone, which may be, for example, 2600 cycles. This shunt path to ground serves as a band-elimination filter for energy going beyond it. At the same time, the eliminated energy at the signaling frequency is picked off by way of the secondary winding of transformer 30. Filter section 27 thus serves as a band-pass filter for energy going through the secondary winding of transformer 30. Filter section 28, which is a series element in the path to receiving amplifier 23, is made up of an inductor 32 in parallel with a capacitor 33. Inductor 32 and capacitor 33 are tuned to anti-resonance at the signalling frequency to improve upon the band elimination effect provided by filter section 27.

The signaling receiver in FIG. 2 includes both a signaling detector, made up by an amplifier 34 and a rectifier 35, and a guard detector, made up by an amplifier 36 and a rectifier 37. Signal amplifier 34 receives energy at the signaling frequency from the secondary winding of transformer 30 in filter section 27. Guard amplifier 36, on the other hand, receives the remaining energy in the voice-frequency band from the right-hand or output side of filter section 27. Rectifiers 35 and 37 are oppositely poled, as indicated, and their outputs are combined through a pair of resistors 38 and 39 and applied to a signal-to-guard detector 40. Detector 40, which is illustrated in more detail in FIG. 3, supplies an output only when the signal-to-guard ratio exceeds a predetermined level and passes that output through a diode 52 and a delay circuit 41 to the operating coil of relay R. Diode 52 is, as shown, poled for forward current flow toward delay circuit 41. The delay afforded by delay circuit 41 may, for example, be of the order of 30 milliseconds. Resistors 38 and 39, as well as the gains of amplifiers 34 and 36, are proportioned to provide the desired signal-to-guard threshold level for detector 40. Guard rectifier 37 is, as illustrated, connected to resistor 39 through the parallel combination of a break contact of relay R and a make contact of relay H.

The output of signal-to-guard detector 40 is additionally connected through a diode 42, a break contact of relay R, and a small protecting resistor 43 to the base electrode of an n-p-n transistor 44. Diode 42 is poled, as illustrated, from detector 40 toward transistor 44. The emitter electrode of transistor 44 is connected to a fixed reference potential provided by a breakdown diode 45 connected from the emitter to a negative 48-volt source and a resistor 46 connected from the emitter to ground. The reverse direction of conductivity of breakdown diode 45 is, as shown, from resistor 46 toward the negative 48-volt source. The operating coil of relay H, which operates more quickly than relay R (e.g., within 5 milliseconds), is returned to ground from the collector electrode of transistor 44.

A delayed release for relay H after it has been operated is provided by a resistor 48, a timing capacitor 49, a resistor 50, and a resistor 51. Capacitor 49 is connected from ground through a make contact of relay H and resistor 48 to the collector electrode of transistor 44. Capacitor 49 is, in addition, connected from ground through a break contact of relay H to the junction between resistors 50 and 51. Resistors 50 and 51, in turn, are connected in series between ground and a negative 48-volt source to form a voltage divider. Timing capacitor 49 is, in this way, provided with a time constant which causes relay H to release automatically approximately 200 milliseconds after it has been operated.

When the trunk becomes idle, a 2600 cycle tone is received by the equipment which has just been described. Because there is no significant guard energy, signal-to-guard detector 40 generates a voltage less negative than normal at its output. This voltage places a forward bias on the emitter-base junction of transistor 44, causing the emitter-collector path of transistor 44 to conduct and relay H to operate within 5 milliseconds. As soon as relay H operates, timing capacitor 49, which has been charged to a negative voltage by the potentiometer consisting of resistors 50 and 51, is connected to resistor 48 and begins to discharge. When the voltage on capacitor 49 rises, after approximately 200 milliseconds, to a point sufficiently close to ground, there is no longer sufficient current through the operating coil of relay H to hold relay H operated. Relay H then releases. In the meantime, approximately 30 milliseconds after receipt of the 2600 cycle tone, relay R has operated, opening the "E" lead to the central office equipment.

With relay R operated and relay H released, the receiving portion of the single-frequency signaling equipment thus registers a trunk-idle indication at the central office but still provides for the occasion when a subscriber may need to talk in the so-called free call condition. This happens, for example, when a telephone subscriber reaches an intercept operator. The intercept operator needs to talk to the subscriber with the signaling tone present since, if the tone were removed, the "E" lead would be grounded and the subscriber would be charged for the call. Operation of relays H and R opens the direct path from preamplifier 22 to receiving amplifier 23 and substitutes the path through band-elimination filter sections 27 and 28. The 2600 cycle signaling tone is thus removed from the energy reaching the subscriber at the cost of a slight degradation in transmission quality. At the same time, the path from guard rectifier 37 to signal-to-guard detector 40 is opened, preventing the intercept operator's speech from releasing relay R.

When the trunk becomes busy, the 2600 cycle signaling tone is no longer received and supplied to the signal detector. Signal-to-guard detector 40 then supplies a more negative voltage, which no longer forward biases diodes 42 and 52. Relay R releases, causing both the guard detector and the normal path from preamplifier 22 to receiving amplifier 23 to be restored. Release of relay R causes the "E" lead to be grounded and, hence, a trunk-busy indication to be registered with the central office equipment. Restoration of the guard detector makes it possible, once again, for the energy outside of the signaling frequency in incoming speech to prevent most false trunk-idle indications which might otherwise be caused by energy at the signaling frequency. If the energy in incoming speech at 2600 cycles is strong enough, however, there is nothing in the receiving portion of the single-frequency signaling receiver that will prevent the talk-off.

The present invention solves the talk-off problem by removing 2600 cycle energy from incoming speech *at the* transmitting unit on those occasions when energy at that frequency is sufficiently strong to cause a talk-off at the receiving unit. The transmitting portion of the single-frequency signaling unit illustrated in FIG. 2 is equipped to remove 2600 cycle energy in such fashion.

The transmitting portion of the single-frequency signaling unit is shown in the upper half of FIG. 2 and includes a transmitting amplifier 61 connected to receive speech signals from the transmitting portion of the central office equipment. The output of amplifier 61 is normally connected through a resistor 62 and a break contact of relay H to one portion of the primary winding of a transformer 63. The secondary winding of transformer 63 is connected to the outgoing or transmitting line. Impedance matching is provided by a resistor 64 connected from the left-hand or output side of resistor 62 to ground. Outgoing signaling is provided by a 2600 cycle tone generator 65 connected through a break contact of a relay A to the other portion of the primary winding of transformer 63.

The part of the transmitter which has been described thus far is conventional. The operating coil of relay A is connected between the "M" lead and ground. To signal a trunk-idle condition, the central office equipment grounds the "M" lead, causing relay A to release and the 2600 cycle tone from generator 65 to be transmitted over the trunk. To signal a trunk-busy condition, the central office equipment applies the central office battery to the "M" lead, causing relay A to operate and the 2600 cycle signaling tone to be removed.

To remove the 2600 cycle component of the complex incoming speech waves when necessary, the illustrated embodiment of the invention provides a second path between transmitting amplifier 61 and transformer 63 for use under such conditions. This path includes a resistor 66, a band-elimination filter 67, and a make contact of relay H connected from amplifier 61 to the upper portion of the primary winding of transformer 63. A resistor 68 is returned to ground from the left-hand or output side of resistor 66, and filter 67 is made up of an inductor 69 and a capacitor 70 connected in series from that same point to ground. Inductor 69 and capacitor 70 are tuned to be resonant at the 2600 cycle signaling frequency.

The signal-to-guard ratio of the incoming speech waves from amplifier 61 is determined in much the same manner used in the receiver. Fewer filter elements are required at the transmitter, however, for the reason that a lesser degree of protection is necessary. At the transmitter it is only necessary to guard against talk-off. At the receiver, it is necessary in addition to block the signaling tone from succeeding transmission links and from the subscriber's ear. As shown in the transmitter, an amplifier 71 is connected to the output side of resistor 62 and supplies both signal and guard to rectifier 72. An amplifier 73 is similarly connected to the output side of resistor 66 and supplies only guard to rectifier 74. Because of the shunting effect of band-elimination filter 67 at the signaling frequency, energy at that frequency is effectively removed from the path to guard amplifier 73. Rectifiers 72 and 74 are oppositely poled, as illustrated, and are connected through respective resistors 75 and 76 to a signal-to-guard detector 77.

Figure 3:
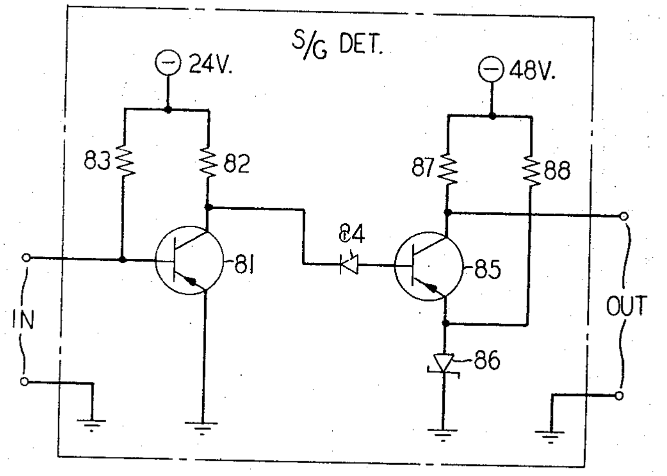
FIG. 3 shows circuit details of a specific signal-to-guard ratio detector used in the embodiment of the invention illustrated in FIG. 2.

Signal-to-guard detector 77, like detector 40 may take the form shown in FIG. 3, and its output is connected through a diode 78, the break contact of relay R, resistor 43, and the base electrode of transistor 44 to operate relay H. Because detector 77 compares signal-plus-guard with guard rather than simply signal with guard, resistors 75 and 76 are proportioned differently than resistors 38 and 39. Resistors 75 and 76 (plus, if necessary, the gains of amplifiers 71 and 73) are proportioned so that the signal-to-guard ratio needed to operate detector 77 is somewhat less than the signal-to-guard ratio needed to operate detector 40. Any potentially troublesome signal-to-guard ratio in incoming speech is thus certain to be detected at the transmitter before it could cause talk-off at the receiver. Like diode 42, diode 78 is poled for easy current flow toward transistor 44 from its associated signal-to-guard detector.

During normal outgoing trunk-busy operation of the equipment illustrated in FIG. 2, speech waves are applied directly to transformer 63 through resistor 62 and the break contact of relay H. As long as their signal-to-guard ratio remains below the threshold established by resistors 75 and 76 and the relative gains of amplifiers 71 and 73, the 2600 cycle component is transmitted along with the remaining components in the voice-frequency range. There is thus no permanent noise penalty of the type incurred in the system disclosed in the above-identified Leonard application. Whenever the signal-to-guard ratio of the incoming speech waves exceeds this threshold, however, the output from detector 77 forward biases diode 78 and the emitter-base junction of transistor 44, causing relay H to operate. When relay H operates, band-elimination filter 67 is inserted in the transmitting path, blocking the troublesome 2600 cycle component at the cost of a small noise penalty only for as long as the condition persists. False operation of relay R in the same signaling unit is prevented by the isolating action of diode 42.

Although relay H releases 200 milliseconds after its initial operation, it operates again promptly if the troublesome signal-to-guard ratio in the incoming speech waves persists. False signaling indications on the "E" lead at the opposite end of the trunk are thus prevented under all conditions of operation.

The signal-to-guard detector shown in FIG. 3 is a simple double-switch arrangement which produces an output voltage which is slightly negative when the input voltage is positive and more highly negative when the input is negative. The input voltage is applied to the base electrode of a p-n-p transistor 81. The emitter electrode of transistor 81 is grounded and the collector is connected through a resistor 82 to a negative 24-volt source. The base of transistor 81 is also connected to the negative 24-volt source through a biasing resistor 83. The collector of transistor 81 is connected through a diode 84 to the base of a second p-n-p transistor 85. Diode 84 is poled for easy current flow from the base of transistor 85 toward the collector of transistor 81. The emitter electrode of transistor 85 is returned to ground through a breakdown diode 86, which is poled in the forward direction from the emitter toward ground. The collector and emitter electrodes of transistor 85 are connected to a negative 48-volt source through respective biasing resistors 87 and 88. The output voltage is taken from the collector electrode of transistor 85.

When the signal-to-guard ratio in either the transmitting path or the receiving path in FIG. 2 exceeds the respective predetermined threshold level, the input voltage applied to the siginal-to-guard detector is positive. The emitter-base junction of transistor 81 is then reverse biased, shutting of transistor 81, and the collector electrode of transistor 81 becomes highly negative. Diode 84 and the emitter-base junction of transistor 85 become forward biased and transistor 85 conducts, causing the collector voltage to rise to a negative value substantially equal to the breakdown voltage of diode 86. When, on the other hand, the signal-to-guard ratio is less than its respective predetermined threshold level, the input voltage applied to the base electrode of transistor 81 is negative. The emitter-base junction of transistor 81 is then forward biased, turning transistor 81 on. The collector electrode of transistor 81 rises in potential to a point near ground, shutting off diode 84 and transistor 85. The collector voltage of transistor 85 then becomes highly negative.

In FIG. 2, the outputs of the two signal-to-guard detectors 40 and 77 are applied to transistor 44 and relay H through a so-called OR gate made up of diodes 42 and 78. Relay H may thus be operated by either detector. Relay R, however, is isolated from detector 77 and may be operated only by detector 40.

It is to be understood that the above-described arrangement is illustrative of the application of the principles of the invention. Numerous other arrangements may be devised by those skilled in the art without departing from the spirit and scope of the invention.

What is claimed is:

1. In a telephone system for sending complex voice-frequency message waves occupying a predetermined frequency band over a telephone trunk from a transmitting terminal to a receiving terminal, means at said transmitting terminal to send a substantially single-frequency tone over said trunk to said receiving terminal to signal and idle trunk condition, means at said receiving terminal to compare the received energy at the frequency of said tone to the received energy in the remainder of said band, means at said receiving terminal to generate an idle trunk indication when the ratio of the received energy at the frequency of said tone to the received energy in the remainder of said band exceeds a predetermined level, a band-elimination filter adapted to block transmission of energy at the frequency of said tone, means at said transmitting terminal to compare the energy in voice-frequency message waves at the frequency of said tone to the energy in the same voice-frequency message waves in the remainder of said band, and means at said transmitting terminal to insert said band-elimination filter to prevent transmission to said receiving terminal of energy in voice-frequency message waves at the frequency of said tone when the ratio of such energy to the energy in the same voice-frequency message waves in the remainder of said band exceeds a predetermined level.

2. In a telephone system for sending complex voice-frequency message waves occupying a predetermined frequency band over a telephone trunk from a transmitting terminal to a receiving terminal, means at said transmitting terminal to send a substantially single-frequency tone over said trunk to said receiving terminal to signal an idle trunk condition, means at said receiving terminal to compare the received energy at the frequency of said tone to the received energy in the remainder of said band, means at said receiving terminal to generate an idle trunk indication when the ratio of the received energy at the frequency of said tone to the received energy in the remainder of said band exceeds a first predetermined level, a band-elimination filter adapted to block transmission of energy at the frequency of said tone, means at said transmitting terminal to compare the energy in voice-frequency message waves at the frequency of said tone to the energy in the same voice-frequency message waves in the remainder of said band, and means at said transmitting terminal to insert said band-elimination filter to prevent transmission to said receiving terminal of energy in voice-frequency message waves at the frequency of said tone when the ratio of such energy to the energy in the same voice-frequencey message waves in the remainder of said band exceeds a second predetermined level which is less than said first predetermined level.

3. A telephone signaling system which comprises a transmitting terminal including a source of complex voice-frequency message waves occupying a predetermined frequency band, a receiving terminal, a trunk circuit connecting said transmitting terminal to said receiving terminal, means at said transmitting terminal to send a substantially single-frequency tone over said trunk circuit to said receiving terminal to signal an idle trunk condition, means at said receiving terminal to compare the received energy at the frequency of said tone to the received energy in the remainder of said band, means at said receiving terminal to generate an idle trunk indication when the ratio of the received energy at the frequency of said tone to the received energy in the remainder of said band exceeds a predetermined level, a pair of transmission paths at said transmitting terminal between said source and said trunk circuit, one of said transmission paths including a band-elimination filter adapted to block transmission of energy at the frequency of said tone, means at said transmitting terminal to compare the energy in the voice-frequency message waves from said source at the frequency of said tone to the energy in the same voice-frequency message waves in the remainder of said band, and means at said transmitting terminal to substitute the one of said transmission paths containing said band-elimination filter for the other of said transmission paths when the ratio of the energy in the voice-frequency message waves from said source at the frequency of said tone to the energy in the same voice-frequency message waves in the remainder of said band exceeds a predetermined level.

4. A telephone signaling system which comprises a transmitting terminal including a source of complex voice-frequency message waves occupying a predetermined frequency band, a receiving terminal, a trunk circuit connecting said transmitting terminal to said receiving terminal, means at said transmitting terminal to send a substantially single-frequency tone over said trunk circuit to said receiving terminal to signal an idle trunk condition, means at said receiving terminal to compare the received energy at the frequency of said tone to the received energy in the remainder of said band, means at said receiving terminal to generate an idle trunk indication when the ratio of the received energy at the frequency of said tone to the received energy in the remainder of said band exceeds a first predetermined level, a pair of transmission paths at said transmitting terminal between said source and said trunk circuit, one of said transmission paths including a band-elimination filter adapted to block transmission of energy at the frequency of said tone, means at said transmitting terminal to compare the energy in the voice-frequency message waves from said source at the frequency of said tone to the energy in the same voice-frequency message waves in the remainder of said band, and means at said transmitting terminal to substitute the one of said transmission paths containing said band-elimination filter for the other of said transmission paths when the ratio of the energy in the voice-frequency message waves from said source at the frequency of said tone to the energy in the same voice-frequency message waves in the remainder of said band exceeds a second predetermined level which is less than said first predetermined level.

References Cited

UNITED STATES PATENTS

| | | | |
|---|---|---|---|
| 2,935,572 | 5/1960 | Hastings et al. | 179—84 |
| 2,971,062 | 2/1961 | Salihi | 179—84 |
| 3,103,558 | 9/1963 | Qigotky | 170—84 |

KATHLEEN H. CLAFFY, *Primary Examiner.*

H. ZELLER, *Assistant Examiner.*